(12) United States Patent
Bombrys et al.

(10) Patent No.: US 8,511,446 B2
(45) Date of Patent: Aug. 20, 2013

(54) NESTED CHECK HIGH SPEED VALVE

(75) Inventors: Timothy Bombrys, Bowling Green, OH (US); Darrell Breese, Ypsilanti, MI (US); Gary Groves, Toledo, OH (US); Karl Kazmirski, Temperance, MI (US); Daniel Keil, Temperance, MI (US); Matthew Roessle, Temperance, MI (US); Ben Schaller, Toledo, OH (US); Matthew Schelosky, Temperance, MI (US); Jim Szymusiak, Dearborn Heights, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 13/564,973

(22) Filed: Aug. 2, 2012

(65) Prior Publication Data

US 2012/0292147 A1 Nov. 22, 2012

Related U.S. Application Data

(62) Division of application No. 12/133,448, filed on Jun. 5, 2008, now Pat. No. 8,297,418.

(51) Int. Cl.
*F16F 9/49* (2006.01)

(52) U.S. Cl.
USPC .......... 188/280; 188/322.15; 188/322.22; 188/315; 188/275; 188/282.8

(58) Field of Classification Search
USPC ............ 188/280, 281, 282.1, 282.5–282.9, 188/315, 322.14, 322.15, 322.22
See application file for complete search history.

(56) References Cited

U.S. PATENT DOCUMENTS

| 2,740,500 | A | * | 4/1956 | Brundrett et al. | .......... 188/282.5 |
| 3,134,460 | A | * | 5/1964 | Bourcier | .......... 188/317 |
| 4,401,196 | A | | 8/1983 | Grundei | |
| 4,624,347 | A | | 11/1986 | Mourray | |
| 4,671,392 | A | * | 6/1987 | Wossner | .......... 188/266.3 |
| 4,721,130 | A | | 1/1988 | Hayashi | |
| 4,964,493 | A | | 10/1990 | Yamaura et al. | |
| 5,368,141 | A | * | 11/1994 | Clarke | .......... 188/284 |

(Continued)

FOREIGN PATENT DOCUMENTS

| EP | 1884397 | 2/2008 |
| JP | 2004-332835 | 11/2004 |
| KR | 10-2008-0023512 | 3/2008 |
| WO | 97-16656 | 5/1997 |

OTHER PUBLICATIONS

International Search Report dated Jan. 13, 2010 from corresponding PCT Application No. PCT/US2009/046382.

(Continued)

*Primary Examiner* — Robert A Siconolfi
*Assistant Examiner* — Mariano Sy
(74) *Attorney, Agent, or Firm* — Harness, Dickey & Pierce, P.L.C.

(57) ABSTRACT

A shock absorber has a compression valve assembly which functions during a compression stroke, a rebound valve assembly which functions during a rebound stroke and a velocity sensitive valve which is in series with one or both of the compression valve assembly and the rebound valve assembly. The compression valve assembly, the rebound valve assembly and the velocity sensitive valve can be incorporated into a piston assembly, a base valve assembly or both.

14 Claims, 11 Drawing Sheets

(56) References Cited

U.S. PATENT DOCUMENTS

| | | | |
|---|---|---|---|
| 5,372,224 A * | 12/1994 | Samonil et al. | 188/282.3 |
| 5,398,786 A * | 3/1995 | Mintgen | 188/284 |
| 5,810,128 A * | 9/1998 | Eriksson et al. | 188/289 |
| 5,823,306 A | 10/1998 | de Molina | |
| 5,971,117 A * | 10/1999 | Grundei et al. | 188/288 |
| 6,199,671 B1 | 3/2001 | Thyssen | |
| 6,290,035 B1 | 9/2001 | Kazmirski et al. | |
| 6,318,523 B1 | 11/2001 | Moradmand et al. | |
| 6,340,081 B1 | 1/2002 | Keil | |
| 6,460,664 B1 | 10/2002 | Steed et al. | |
| 6,644,445 B2 | 11/2003 | Dodge | |
| 6,681,906 B1 * | 1/2004 | Sasse | 188/284 |
| 6,776,269 B1 * | 8/2004 | Schel | 188/287 |
| 6,918,473 B2 * | 7/2005 | Deferme | 188/322.15 |
| 7,699,148 B2 | 4/2010 | Forster | |
| 7,789,208 B2 | 9/2010 | Yang | |
| 8,113,324 B2 * | 2/2012 | Baalmann et al. | 188/322.15 |
| 2008/0121478 A1 | 5/2008 | Maniowski et al. | |

OTHER PUBLICATIONS

Written Opinion dated Jan. 13, 2010 from corresponding PCT Application No. PCT/US2009/046382.

* cited by examiner

NESTED CHECK HIGH SPEED VALVE

CROSS-REFERENCE TO RELATED APPLICATIONS

This application is a divisional of U.S. patent application Ser. No. 12/133,448 filed on Jun. 5, 2008, now U.S. Pat. No. 8,297,418. The entire disclosure of the above application is incorporated herein by reference.

FIELD

The present disclosure relates generally to hydraulic dampers for use in a suspension system such as a suspension system used for automotive vehicles. More particularly, the present disclosure relates to high speed valve assemblies that can be incorporated into piston assemblies and/or base valve assemblies.

BACKGROUND

The statements in this section merely provide background information related to the present disclosure and may not constitute prior art.

Shock absorbers are used in conjunction with automotive suspension systems and other suspension systems to absorb unwanted vibrations which occur during movement of the suspension system. In order to absorb these unwanted vibrations, automotive shock absorbers are generally connected between the sprung (body) and the unsprung (suspension/chassis) masses of the vehicle.

The most common type of shock absorbers for automobiles is the dashpot type which can be either a mono-tube design or a dual-tube design. In the mono-tube design, a piston is located within a pressure tube and is connected to the sprung mass of the vehicle through a piston rod. The pressure tube is connected to the unsprung mass of the vehicle. The piston divides the pressure tube into an upper working chamber and a lower working chamber. The piston includes compression valving which limits the flow of damping fluid from the lower working chamber to the upper working chamber during a compression stroke and rebound valving which limits the flow of damping fluid from the upper working chamber to the lower working chamber during a rebound or extension stroke. Because the compression valving and the rebound valving have the ability to limit the flow of damping fluid, the shock absorber is able to produce a damping force which counteracts the vibrations which would otherwise be transmitted from the unsprung mass to the sprung mass.

In a dual-tube shock absorber, a fluid reservoir is defined between the pressure tube and a reservoir tube which is positioned around the pressure tube. A base valve assembly is located between the lower working chamber and the fluid reservoir to control the flow of dampening fluid. The compression valving of the piston is moved to the base valve assembly and is replaced by a compression check valve assembly. In addition to the compression valving, the base valve assembly includes a rebound check valve assembly. The compression valving of the base valve assembly produces the damping force during a compression stroke, and the rebound valving of the piston produces the damping force during a rebound or extension stroke. Both the compression and rebound check valve assemblies permit fluid flow in one direction, but prohibit fluid flow in an opposite direction; however, they are designed such that they do not generate a damping force.

SUMMARY

The present disclosure is directed to a shock absorber which includes high speed valve assemblies in both the piston assembly and the base valve assembly. The high speed valve assembly includes valving which reduces the flow area during high speed movements of the hydraulic fluid.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
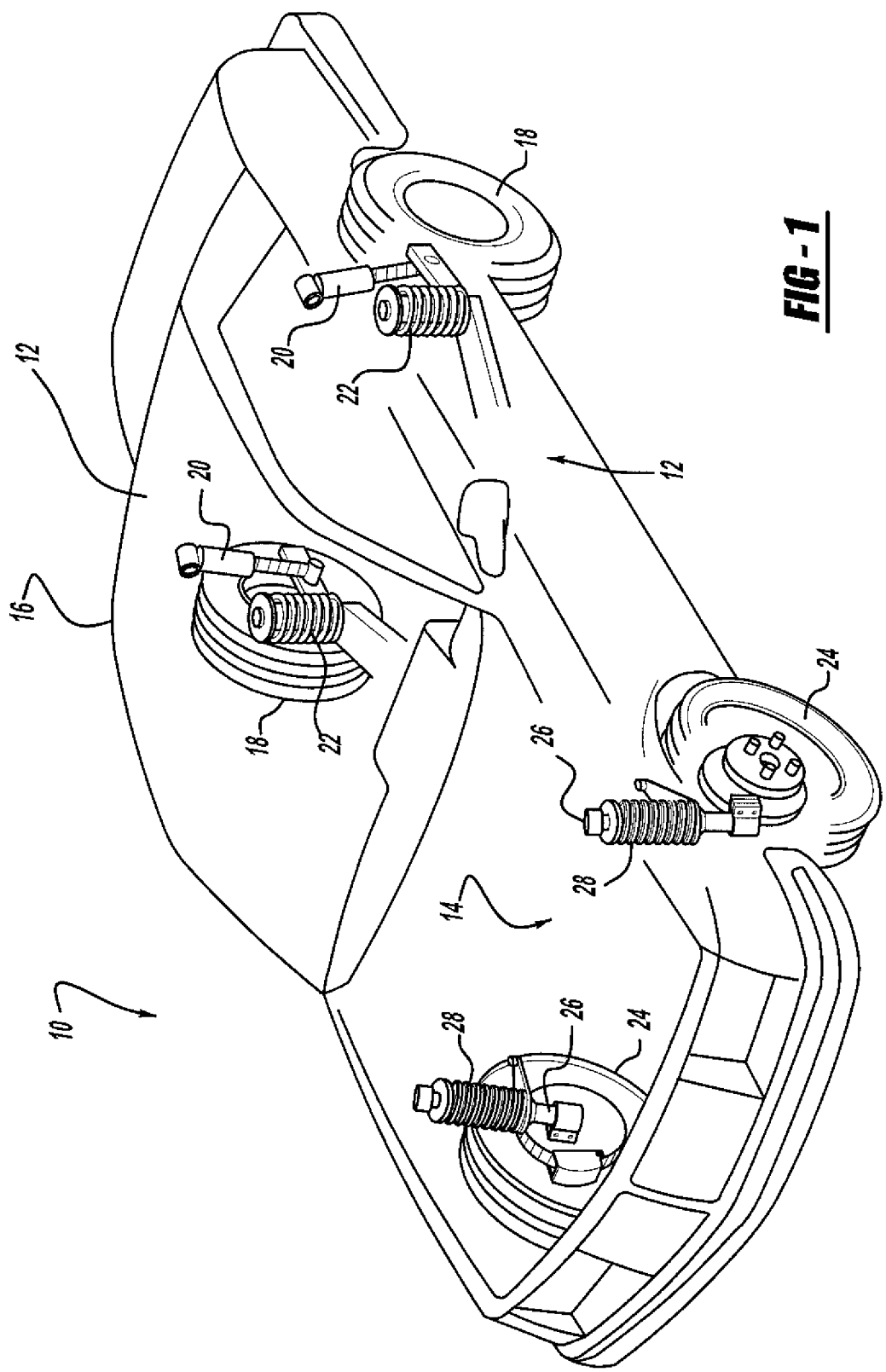
FIG. 1 is a schematic representation of a typical automobile which incorporates the unique base valve assembly in accordance with the present disclosure.

Referring now to the drawings in which like reference numerals designate like or corresponding parts throughout the several views, there is shown in FIG. 1 a vehicle which includes a suspension system incorporating shock absorbers in accordance with the present disclosure and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18 of vehicle 10. The rear axle assembly is operatively connected to body 16 by means of a pair of shock absorbers 20 and a pair of helical coil springs 22. Similarly, front suspension 14 includes a transversely extending front axle assembly (not shown) to operatively support a pair of front wheels 24 of vehicle 10. The front axle assembly is operatively connected to body 16 by means of a second pair of shock absorbers 26 and by a pair of helical coil springs 28. Shock absorbers 20 and 26 serve to dampen the relative motion of the unsprung mass (i.e., front and rear suspensions 12 and 14, respectively) and the sprung mass (i.e., body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
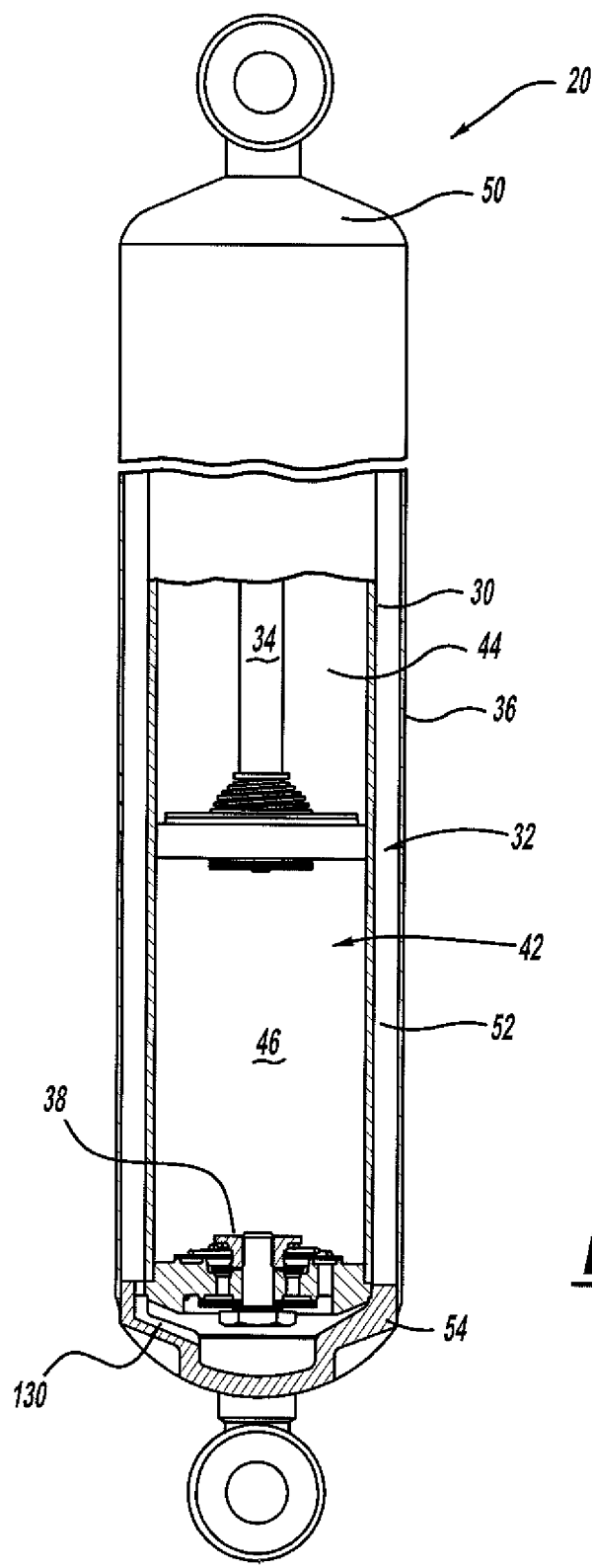
FIG. 2 is a side sectional view of the shock absorber in accordance with the present disclosure.

Referring now to FIG. 2, shock absorber 20 is shown in greater detail. While FIG. 2 illustrates only shock absorber 20, it is to be understood that shock absorber 26 also includes the valve assemblies described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reservoir tube 36 and a base valve assembly 38.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system seals the interface between upper end cap 50, reservoir tube 36 and piston rod 34. The end of piston rod 34 opposite to piston assembly 32 is adapted to be secured to the sprung portion of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38.

Reservoir tube 36 surrounds pressure tube 30 to define a fluid reservoir chamber 52 located between tubes 30 and 36. The bottom end of reservoir tube 36 is closed by an end cap 54 which is adapted to be connected to the unsprung portion of vehicle 10. The upper end of reservoir tube 36 is attached to upper end cap 50. Base valve assembly 38 is disposed between lower working chamber 46 and reservoir chamber 52 to control the flow of fluid between chambers 46 and 52. When shock absorber 20 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 20 compresses in length, an excess of fluid must be removed from lower working chamber 46 due to the "rod volume" concept. Thus, fluid will flow from lower working chamber 46 to reservoir chamber 52 through base valve assembly 38 as detailed below.

Figure 3:
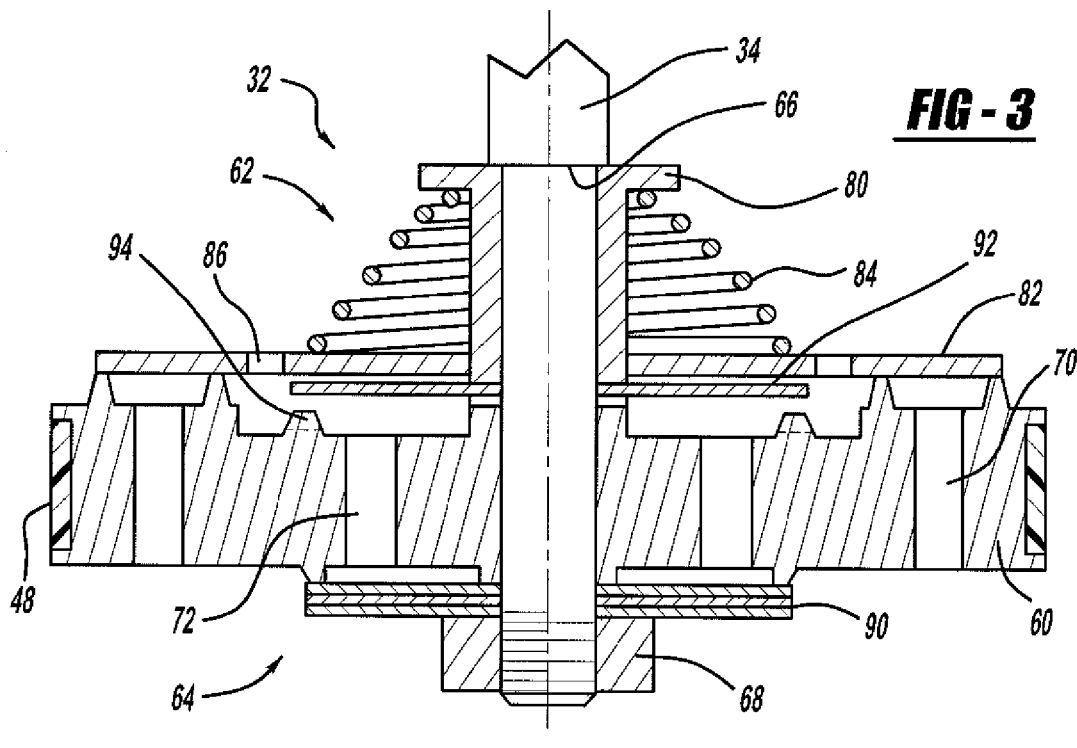
FIG. 3 is an enlarged cross-sectional view of the piston assembly illustrated in FIG. 2.

Referring now to FIG. 3, piston assembly 32 comprises a valve body 60, a compression check valve assembly 62 and a rebound valve assembly 64. Compression check valve assembly 62 is assembled against a shoulder 66 on piston rod 34. Valve body 60 is assembled against compression check valve assembly 62 and rebound valve assembly 64 is assembled against valve body 60. A nut 68 secures these components to piston rod 34. Valve body 60 defines a plurality of compression passages 70 and a plurality of rebound passages 72.

Compression check valve assembly 62 comprises a retainer 80, a valve disc 82 and a spring 84. Retainer 80 abuts shoulder 66 on one end and valve body 60 on the other end. Valve disc 82 abuts valve body 60 and closes compression passages 70. Valve disc 82 defines a plurality of apertures 86 which leave rebound passages 72 open. Spring 84 is disposed between retainer 80 and valve disc 82 to bias valve disc 82 against valve body 60. During a compression stroke, fluid in lower working chamber 46 is pressurized causing fluid pressure to react against valve disc 82. When the fluid pressure against valve disc 82 overcomes the biasing load of spring 84, valve disc 82 separates from valve body 60 to open compression passages 70 and allow fluid flow from lower working chamber 46 to upper working chamber 44. Typically, spring 84 only exerts a light biasing load on valve disc 82 and compression check valve assembly 62 acts as a check valve between chambers 46 and 44. The damping characteristics for shock absorber 20 during a compression stroke are controlled by base valve assembly 38 which accommodates the flow of fluid from lower working chamber 46 to reservoir chamber 52 due to the "rod volume" concept. During a rebound stroke, compression passages 70 are closed by valve disc 82.

Rebound valve assembly 64 comprises a plurality of valve discs 90 and a velocity sensitive valve disc 92. The plurality of valve discs 90 are sandwiched between valve body 60 and nut 68 to close the plurality of rebound passages 72. Velocity sensitive valve disc 92 is nested below valve disc 82 of compression check valve assembly 62 on the opposite side of valve body 60 from the plurality of valve discs 90. When fluid pressure is applied to valve discs 90, they will elastically deflect at their outer peripheral edge to open rebound valve assembly 64.

During a rebound stroke, fluid in upper working chamber 44 is pressurized causing fluid to react against valve discs 90. When the fluid pressure reacting against valve discs 90 overcomes the bending load for valve discs 90, valve discs 90 elastically deflect opening rebound passages 72 allowing fluid flow from upper working chamber 44, through apertures 86, past velocity sensitive valve disc 92, through rebound passages 72 and into lower working chamber 46. The strength of valve discs 90 and the size of rebound passages 72 will determine the damping characteristics for shock absorber 20 in rebound. When the fluid flow past velocity sensitive valve disc 92 reaches a predetermined velocity, the flow between velocity sensitive valve disc 92 and valve body 60 become restricted and a pressure drop develops. Because the pressure on the upper working chamber side of velocity sensitive valve disc 92 is now higher than the pressure on the lower working chamber side of velocity sensitive valve disc 92, velocity sensitive valve disc 92 will deflect towards valve body 60. Eventually contact will occur between velocity sensitive valve disc 92 and valve body 60 creating a closed position. Velocity sensitive valve disc 92 contacts a disc seat 94 which is castled in geometry and, in the closed position, the total flow area through the castled disc seat 94 is designed to be less than the total flow area of the plurality of rebound passages 72. Thus, when velocity sensitive valve disc 92 closes, the flow area is decreased and the damping force that is developed will increase. While disc seat 94 is illustrated as being castled to provide flow past velocity sensitive valve disc 92, it is within the scope of the present disclosure to provide a continuous disc seat 94 and have a plurality of flow ports formed in velocity sensitive valve disc 92.

Figure 4:
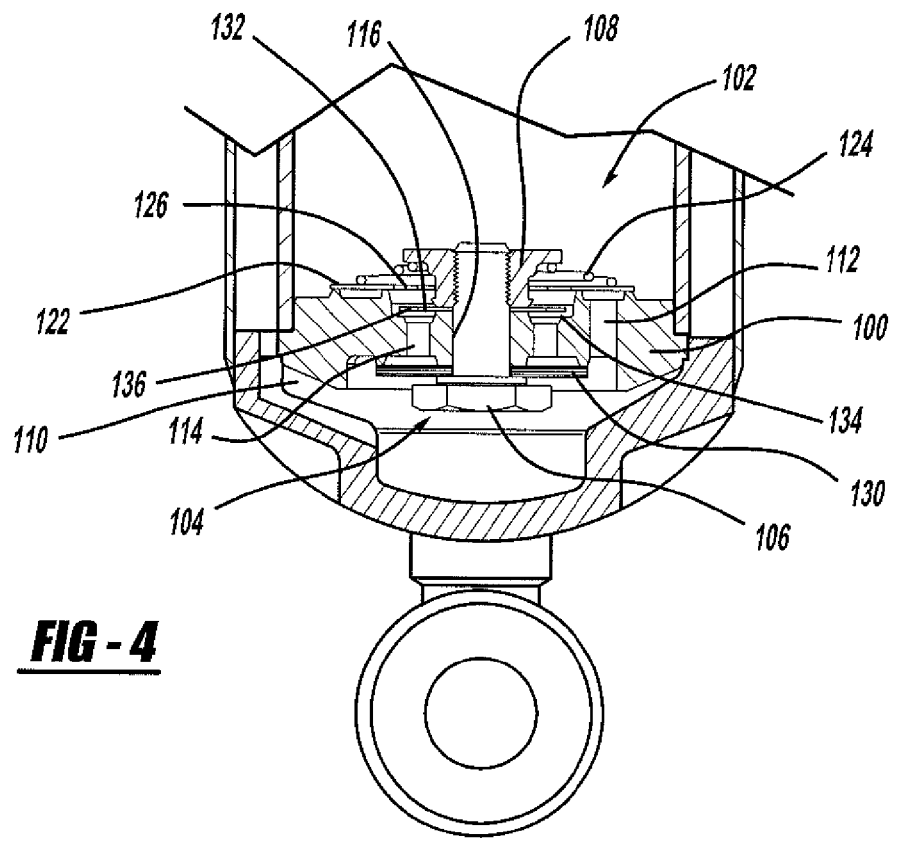
FIG. 4 is an enlarged cross-sectional view of the base valve assembly illustrated in FIG. 2.

Referring now to FIG. 4, base valve assembly 38 comprises a valve body 100, an intake or rebound check valve assembly 102, a compression valve assembly 104, a retaining bolt 106 and a retaining nut 108. Valve body 100 is secured to pressure tube 30 and end cap 54 by press fitting or by other methods known well in the art. End cap 54 is secured to reservoir tube 36 and it defines a plurality of fluid passages 110 which allow communication between reservoir chamber 52 and base valve assembly 38. Valve body 100 defines a plurality of intake or rebound fluid passages 112, a plurality of compression fluid passages 114, and a central bore 116. Retaining bolt 106 extends through central bore 116 and threadingly engages retaining nut 108 to secure both rebound check valve assembly 102 and compression valve assembly 104 to valve body 100. While FIG. 4 illustrates retaining bolt 106 and retaining nut 108 other retainers including but not limited to a valve pin can be utilized.

Rebound check valve assembly 102 comprises retaining nut 108, a valve disc 122 and a spring 124. Valve disc 122 abuts valve body 100 and closes rebound fluid passages 112. Valve disc 122 defines a plurality of apertures 126 which leave compression fluid passages 114 open. Spring 124 is disposed between retaining nut 108 and valve disc 122 to bias valve disc 122 against valve body 100. During a rebound stroke, fluid in lower working chamber 46 is reduced in pressure causing fluid pressure in reservoir chamber 52 to react against valve disc 122. When the fluid pressure against valve disc 122 overcomes the biasing load of spring 124, valve disc 122 separates from valve body 100 to open rebound fluid passages 112 and allow fluid flow from reservoir chamber 52 to lower working chamber 46. Typically, spring 124 only exerts a light biasing load on valve disc 122 and rebound check valve assembly 102 acts as a check valve between chambers 52 and 46. The damping characteristics for shock absorber 20 during a rebound stroke are controlled by valve assembly 32 which accommodates the flow of fluid from upper working chamber 44 to lower working chamber 46 as detailed above. During a compression stroke, rebound fluid passages 112 are closed by valve disc 122.

Compression valve assembly 104 comprises a plurality of valve discs 130 and a velocity sensitive valve disc 132. The plurality of valve discs 130 are sandwiched between valve body 100 and retaining bolt 106 to close the plurality of compression fluid passages 114. Velocity sensitive valve disc 132 is nested below valve disc 122 of rebound check valve assembly 102 on the opposite side of valve body 100 from the plurality of valve discs 130. When fluid pressure is applied to valve discs 130, they will elastically deflect at their outer peripheral edge to open compression valve assembly 104.

During a compression stroke, fluid in lower working chamber 46 is pressurized causing fluid to react against valve discs 130. When the fluid pressure reacting against valve discs 130 overcomes the bending load for valve discs 130, valve discs 130 elastically deflect opening compression fluid passages 114 allowing fluid flow from lower working chamber 46, through apertures 126, past velocity sensitive valve disc 132, through compression fluid passages 114 and into reservoir chamber 52. The strength of valve discs 130 and the size of compression fluid passages 114 will determine the damping characteristics for shock absorber 20 in compression. When the fluid flow past velocity sensitive valve disc 132 reaches a predetermined velocity, the flow between velocity sensitive valve disc 132 and valve body 100 becomes restricted and a pressure drop develops. Because the pressure on the lower working chamber side of velocity sensitive valve disc 132 is now higher than the pressure on the reservoir chamber side of velocity sensitive valve disc 132, velocity sensitive valve disc 132 will deflect towards valve body 100. Eventually contact will occur between velocity sensitive valve disc 132 and valve body 100 creating a closed position. Velocity sensitive valve disc 132 contacts a disc seat 134 which is continuous and velocity sensitive valve disc defines a plurality of flow ports 136 and, in the closed position, the total flow area through ports 136 is designed to be less than the total flow area of the plurality of compression fluid passages 114. Thus, when velocity sensitive valve disc 132 closes, the flow area is decreased and the damping force that is developed will increase.

Figure 5:
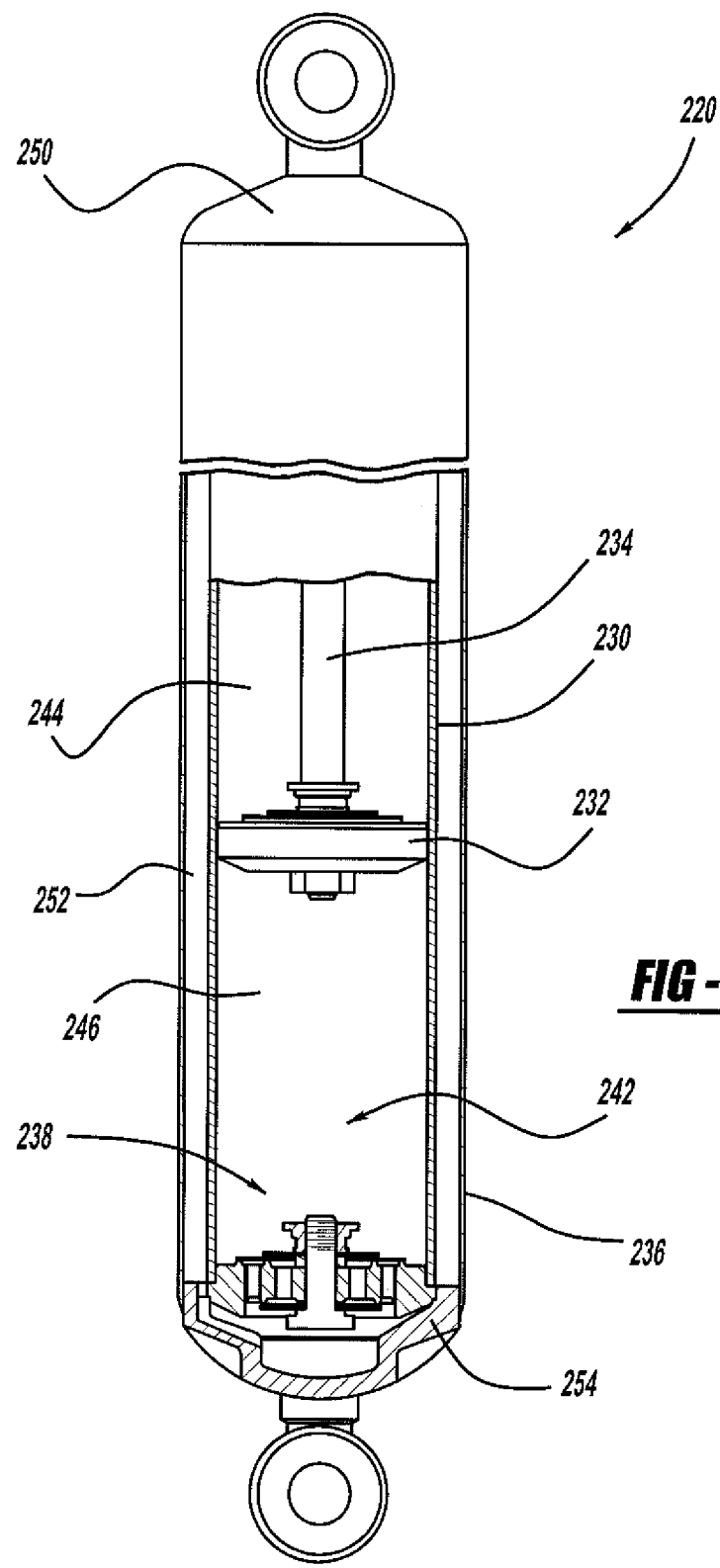
FIG. 5 is a side sectional view of a shock absorber in accordance with another embodiment of the present invention.

Referring now to FIG. 5, a shock absorber 220 is shown in greater detail. While FIG. 5 illustrates only shock absorber 220, it is to be understood that shock absorber 26 can also include the valve assemblies described below for shock absorber 220. Shock absorber 26 only differs from shock absorber 220 in the manner in which it is adapted to be connected to the sprung and unsprung masses of vehicle 10. Shock absorber 220 comprises a pressure tube 230, a piston assembly 232, a piston rod 234, a reservoir tube 236 and a base valve assembly 238.

Pressure tube 230 defines a working chamber 242. Piston assembly 232 is slidably disposed within pressure tube 230 and divides working chamber 242 into an upper working chamber 244 and a lower working chamber 246. A seal 248 is disposed between piston assembly 232 and pressure tube 230 to permit sliding movement of piston assembly 232 with respect to pressure tube 230 without generating undue frictional forces as well as sealing upper working chamber 244 from lower working chamber 246. Piston rod 234 is attached to piston assembly 232 and extends through upper working chamber 244 and through an upper end cap 250 which closes the upper end of pressure tube 230. A sealing system seals the interface between upper end cap 250, reservoir tube 236 and piston rod 234. The end of piston rod 234 opposite to piston assembly 232 is adapted to be secured to the sprung portion of vehicle 10. Valving within piston assembly 232 controls the movement of fluid between upper working chamber 244 and lower working chamber 246 during movement of piston assembly 232 within pressure tube 230. Because piston rod 234 extends only through upper working chamber 244 and not lower working chamber 246, movement of piston assembly 232 with respect to pressure tube 230 causes a difference in the amount of fluid displaced in upper working chamber 244 and the amount of fluid displaced in lower working chamber 246. The difference in the amount of fluid displaced is known as the "rod volume" and it flows through base valve assembly 238.

Reservoir tube 236 surrounds pressure tube 230 to define a fluid reservoir chamber 252 located between tubes 230 and 236. The bottom end of reservoir tube 236 is closed by an end cap 254 which is adapted to be connected to the unsprung portion of vehicle 10. The upper end of reservoir tube 236 is attached to upper end cap 250. Base valve assembly 238 is disposed between lower working chamber 246 and reservoir chamber 252 to control the flow of fluid between chambers 246 and 252. When shock absorber 220 extends in length, an additional volume of fluid is needed in lower working chamber 246 due to the "rod volume" concept. Thus, fluid will flow from reservoir chamber 252 to lower working chamber 246 through base valve assembly 238 as detailed below. When shock absorber 220 compresses in length, an excess of fluid must be removed from lower working chamber 246 due to the "rod volume" concept. Thus, fluid will flow from lower working chamber 246 to reservoir chamber 252 through base valve assembly 238 as detailed below.

Figure 6:
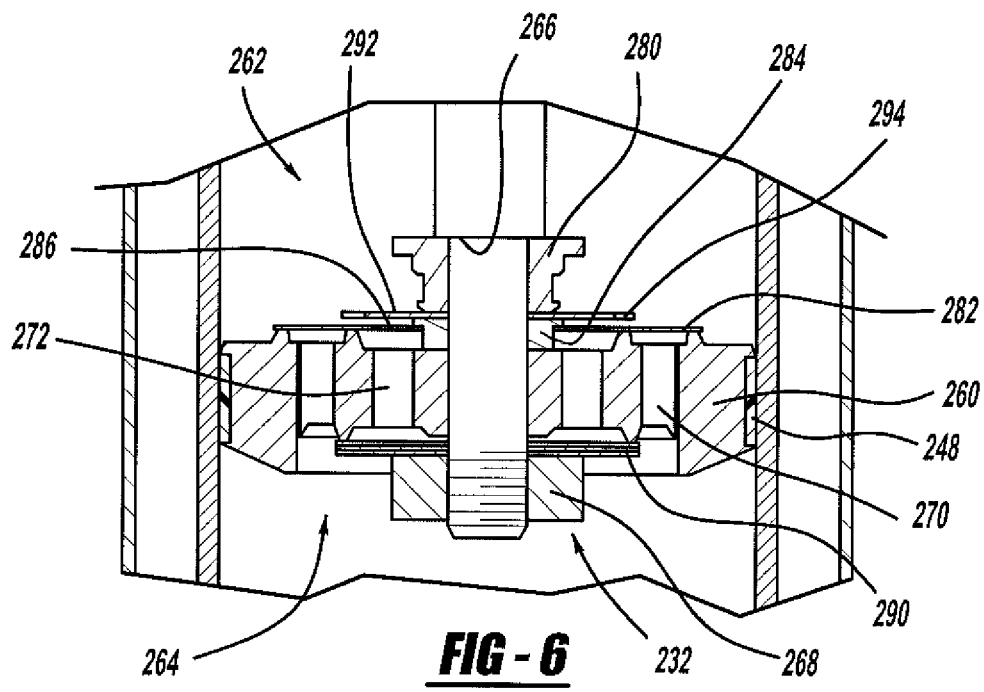
FIG. 6 is an enlarged cross-sectional view of the piston assembly illustrated in FIG. 5.

Referring now to FIG. 6, piston assembly 232 comprises a valve body 260, a compression check valve assembly 262 and a rebound valve assembly 264. Compression check valve assembly 262 is assembled against a shoulder 266 on piston rod 234. Valve body 260 is assembled against compression check valve assembly 262 and rebound valve assembly 264 is assembled against valve body 260. A nut 268 secures these components to piston rod 234. Valve body 260 defines a plurality of compression passages 270 and a plurality of rebound passages 272.

Compression check valve assembly 262 comprises a retainer 280, a valve disc 282 and a spacer 284. Retainer 280 abuts shoulder 266 and spacer 284 abuts valve body 260 on the other end. Valve disc 282 abuts valve body 260 and closes compression passages 270. Valve disc 282 defines a plurality of apertures 286 which leave rebound passages 272 open. During a compression stroke, fluid in lower working chamber 246 is pressurized causing fluid pressure to react against valve disc 282. When the fluid pressure against valve disc 282 overcomes the bending load of valve disc 282, valve disc 282 deflects to separate from valve body 260 to open compression passages 270 and allow fluid flow from lower working chamber 246 to upper working chamber 244. Typically, valve disc 282 only exerts a light biasing load on piston body 260 and compression check valve assembly 262 acts as a check valve between chambers 246 and 244. The damping characteristics for shock absorber 220 during a compression stroke are controlled by base valve assembly 238 which accommodates the flow of fluid from lower working chamber 246 to reservoir chamber 252 due to the "rod volume" concept. During a rebound stroke, compression passages 270 are closed by valve disc 282.

Rebound valve assembly 264 comprises a plurality of valve discs 290 and a velocity sensitive valve disc 292. The plurality of valve discs 290 are sandwiched between valve body 260 and nut 268 to close the plurality of rebound passages 272. Velocity sensitive valve disc 292 is nested above valve disc 282 of compression check valve assembly 262 on the opposite side of valve body 260 from the plurality of valve discs 290. Velocity sensitive valve disc 292 defines a plurality of slots or apertures 294 which allow fluid flow when velocity sensitive valve disc 292 is in its closed position. When fluid pressure is applied to valve discs 290, they will elastically deflect at their outer peripheral edge to open rebound valve assembly 264.

During a rebound stroke, fluid in upper working chamber 244 is pressurized causing fluid to react against valve discs 290. When the fluid pressure reacting against valve discs 290 overcomes the bending load for valve discs 290, valve discs 290 elastically deflect opening rebound passages 272 allowing fluid flow from upper working chamber 244, through apertures 286, past velocity sensitive valve disc 292, through rebound passages 272 and into lower working chamber 246. The strength of valve discs 290 and the size of rebound passages 272 will determine the damping characteristics for shock absorber 220 in rebound. When the fluid flow past velocity sensitive valve disc 292 reaches a predetermined velocity, the flow between velocity sensitive valve disc 292 and valve body 260 become restricted and a pressure drop develops. Because the pressure on the upper working chamber side of velocity sensitive valve disc 292 is now higher than the pressure on the lower working chamber side of velocity sensitive valve disc 292, velocity sensitive valve disc 292 will deflect towards valve body 260. Eventually contact will occur between velocity sensitive valve disc 292 and valve disc 282 creating a closed position. The total flow area through apertures 294 of velocity sensitive valve disc 292 is designed to be less than the total flow area of the plurality of rebound passages 272. Thus, when velocity sensitive valve disc 292 closes, the flow area is decreased and the damping force that is developed will increase.

Figure 7:
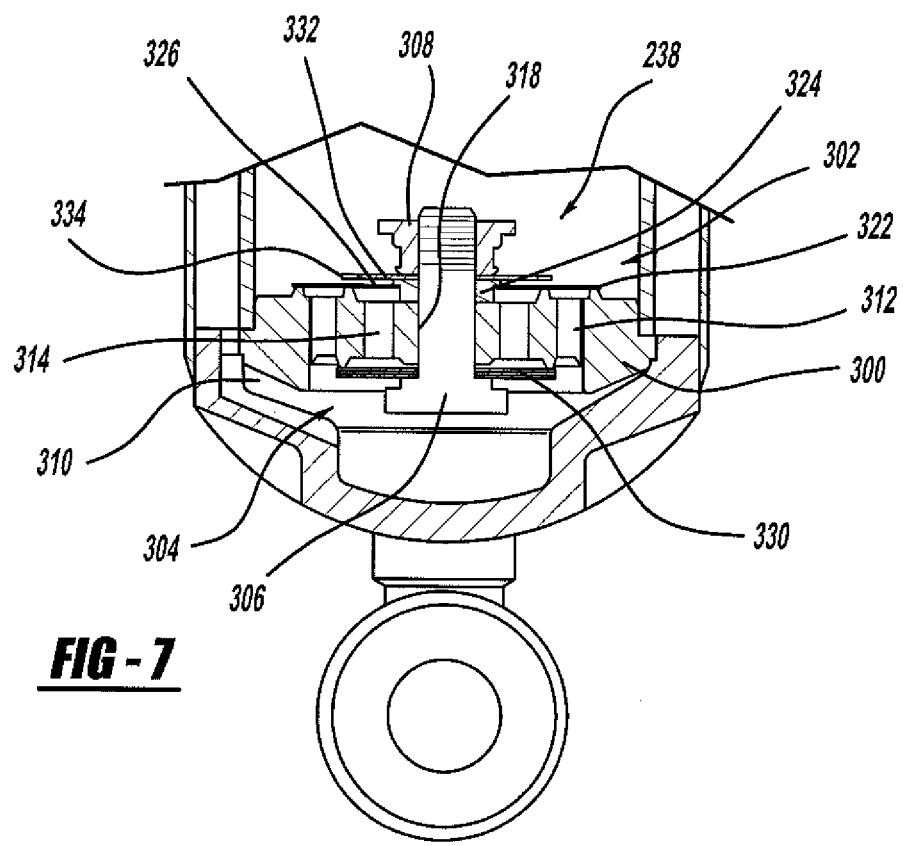
FIG. 7 is an enlarged cross-sectional view of the base valve assembly illustrated in FIG. 5.

Referring now to FIG. 7, base valve assembly 238 comprises a valve body 300, an intake or rebound check valve assembly 302, a compression valve assembly 304, a retaining bolt 306 and a retaining nut 308. Valve body 300 is secured to pressure tube 230 and end cap 254 by press fitting or by other methods known well in the art. End cap 254 is secured to reservoir tube 236 and it defines a plurality of fluid passages 310 which allow communication between reservoir chamber 252 and base valve assembly 238. Valve body 300 defines a plurality of intake or rebound fluid passages 312, a plurality of compression fluid passages 314, and a central bore 318. Retaining bolt 306 extends through central bore 318 and threadingly engages retaining nut 308 to secure both rebound check valve assembly 302 and compression valve assembly 304 to valve body 300. While FIG. 7 illustrates retaining bolt 306 and retaining nut 308 other retainers including but not limited to a valve pin can be utilized.

Rebound check valve assembly 302 comprises retaining nut 308, a valve disc 322 and a spacer 324. Valve disc 322 abuts valve body 300 and closes rebound fluid passages 312. Valve disc 322 defines a plurality of apertures 326 which leave compression fluid passages 314 open. Spacer 324 is disposed between valve body 300 and valve disc 322 to bias valve disc 322 against valve body 300. During a rebound stroke, fluid in lower working chamber 246 is reduced in pressure causing fluid pressure in reservoir chamber 252 to react against valve disc 322. When the fluid pressure against valve disc 322 overcomes the bending load of valve disc 322, valve disc 322 deflects to separate from valve body 300 to open rebound fluid passages 312 and allow fluid flow from reservoir chamber 252 to lower working chamber 246. Typically, the bending load for valve disc 322 only exerts a light biasing load on valve disc 322 and rebound check valve assembly 302 acts as a check valve between chambers 252 and 246. The damping characteristics for shock absorber 220 during a rebound stroke are controlled by piston assembly 232 which accommodates the flow of fluid from upper working chamber 244 to lower working chamber 246 as detailed above. During a compression stroke, rebound fluid passages 312 are closed by valve disc 322.

Compression valve assembly 304 comprises a plurality of valve discs 330 and a velocity sensitive valve disc 332. The plurality of valve discs 330 are sandwiched between valve body 300 and retaining bolt 306 to close the plurality of compression fluid passages 314. Velocity sensitive valve disc 332 is nested above valve disc 322 of rebound check valve assembly 302 on the opposite side of valve body 300 from the plurality of valve discs 330. Velocity sensitive valve disc 332 defines a plurality of slots or apertures 334 which allow fluid flow when velocity sensitive valve disc 332 is in its closed position. When fluid pressure is applied to valve discs 330, they will elastically deflect at their outer peripheral edge to open compression valve assembly 304.

During a compression stroke, fluid in lower working chamber 246 is pressurized causing fluid to react against valve discs 330. When the fluid pressure reacting against valve discs 330 overcomes the bending load for valve discs 330, valve discs 330 elastically deflect opening compression fluid passages 314 allowing fluid flow from lower working chamber 246, through apertures 326, past velocity sensitive valve disc 332, through compression fluid passages 314 and into reservoir chamber 252. The strength of valve discs 330 and the size of compression fluid passages 314 will determine the damping characteristics for shock absorber 220 in compression. When the fluid flow past velocity sensitive valve disc 332 reaches a predetermined velocity, the flow between velocity sensitive valve disc 332 and valve body 300 becomes restricted and a pressure drop develops. Because the pressure on the lower working chamber side of velocity sensitive valve disc 332 is now higher than the pressure on the reservoir chamber side of velocity sensitive valve disc 332, velocity sensitive valve disc 332 will deflect towards valve body 300. Eventually contact will occur between velocity sensitive valve disc 332 and valve disc 322 creating a closed position. The total flow area through apertures 334 of velocity sensitive valve disc 332 is designed to be less than the total flow area of the plurality of compression fluid passages 314. Thus, when velocity sensitive valve disc 332 closes, the flow area is decreased and the damping force that is developed will increase.

Figure 8:
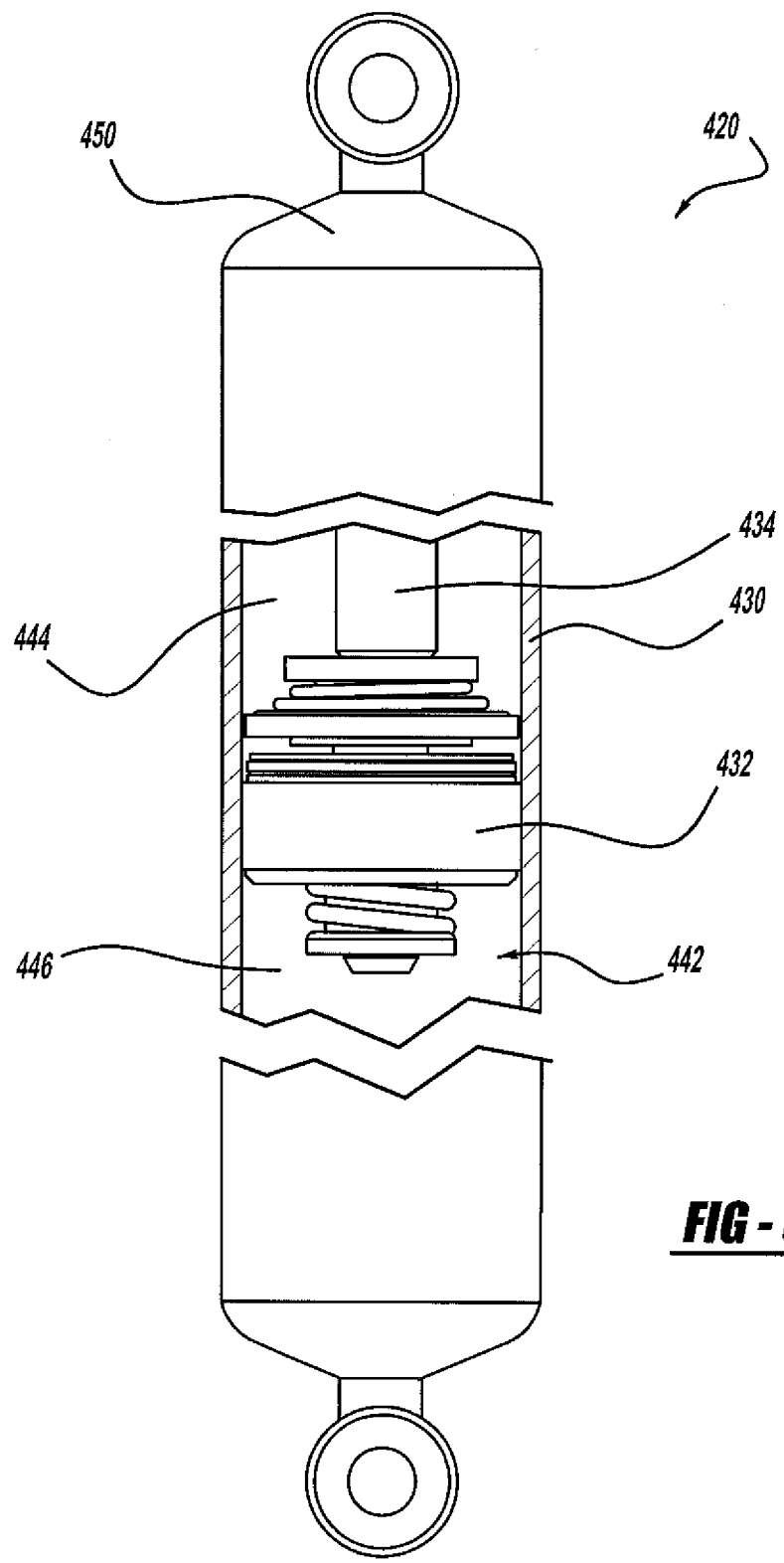
FIG. 8 is a side sectional view of a shock absorber in accordance with another embodiment of the present invention.

Referring now to FIG. 8, a shock absorber 420 is shown in greater detail. Shock absorber 420 is a mono-tube design. While FIG. 8 illustrates only shock absorber 420, it is to be understood that shock absorber 26 can also include the valve assembly described below for shock absorber 420. Shock absorber 26 only differs from shock absorber 420 in the manner in which it is adapted to be connected to the sprung and unsprung masses of vehicle 10. Shock absorber 420 comprises a pressure tube 430, a piston assembly 432 and a piston rod 434.

Pressure tube 430 defines a working chamber 442. Piston assembly 432 is slidably disposed within pressure tube 430 and divides working chamber 442 into an upper working chamber 444 and a lower working chamber 446. A seal 448 is disposed between piston assembly 432 and pressure tube 430 to permit sliding movement of piston assembly 432 with respect to pressure tube 430 without generating undue frictional forces as well as sealing upper working chamber 444 from lower working chamber 446. Piston rod 434 is attached to piston assembly 432 and extends through upper working chamber 444 and through an upper end cap 450 which closes the upper end of pressure tube 430. A sealing system seals the interface between upper end cap 450, reservoir tube 436 and piston rod 434. The end of piston rod 434 opposite to piston assembly 432 is adapted to be secured to the sprung portion of vehicle 10. Valving within piston assembly 432 controls the movement of fluid between upper working chamber 444 and lower working chamber 446 during movement of piston assembly 432 within pressure tube 430. Because piston rod 434 extends only through upper working chamber 444 and not lower working chamber 446, movement of piston assembly 432 with respect to pressure tube 430 causes a difference in the amount of fluid displaced in upper working chamber 444 and the amount of fluid displaced in lower working chamber 446. The difference in the amount of fluid displaced is known as the "rod volume" and it is compensated for by a sealed chamber within working chamber 442 as is known in the art.

Figure 9:
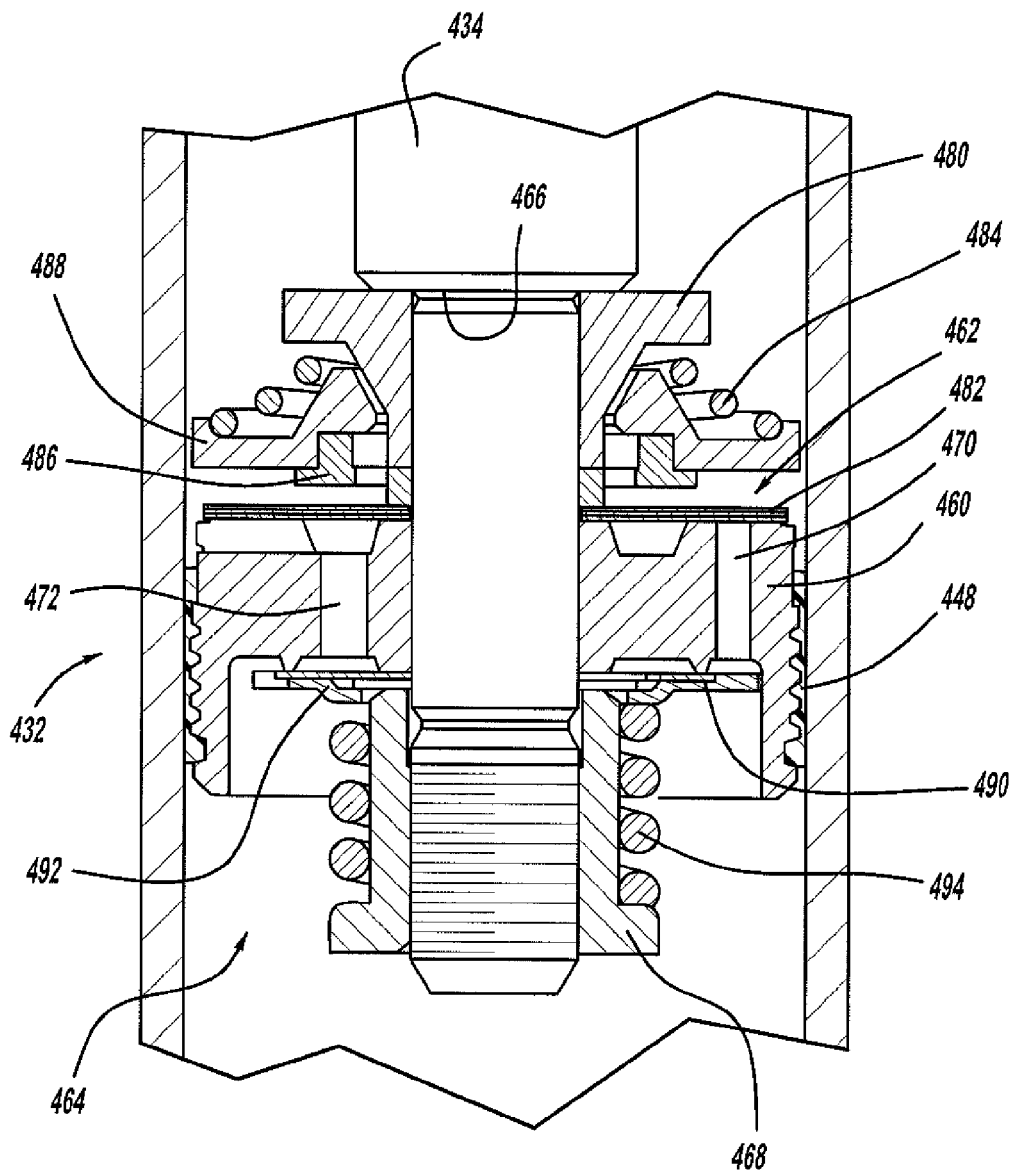
FIG. 9 is an enlarged cross-sectional view of the piston assembly illustrated in FIG. 8.

Referring now to FIG. 9, piston assembly 432 comprises a valve body 460, a compression valve assembly 462 and a rebound valve assembly 464. Compression valve assembly 462 is assembled against a shoulder 466 on piston rod 434. Valve body 460 is assembled against compression valve assembly 462 and rebound valve assembly 464 is assembled against valve body 460. A nut 468 secures these components to piston rod 434. Valve body 460 defines a plurality of compression fluid passages 470 and a plurality of rebound passages 472.

Compression valve assembly 462 comprises a retainer 480, a plurality of valve discs 482, a spring 484, a spacer 486 and a washer or valve disc 488. Retainer 480 abuts shoulder 466 on one end and washer 488 on the opposite end. The plurality of valve discs 482 are disposed between valve body 460 and spacer 486. Valve discs 482 abut valve body 460 and close compression fluid passages 470. The plurality of valve discs 482 are sandwiched between valve body 460 and spacer 486 by the tightening of nut 468. Spring 484 biases washer 488 towards valve body 460 and against spacer 486. Washer 488 has a very close clearance fit between its outside diameter and the inside diameter of pressure tube 430. This clearance is designed to provide a pressure drop across washer 488 which is large enough to overcome the biasing load of spring 484 and move washer 488. The inside diameter of washer 488 and the outside diameter of retainer 480 are designed to provide a flow path when washer 488 is biased against spacer 486. This flow passage will progressively close with the movement of washer 488 away from valve body 460. The closing of this flow path will create the required increase in damping load at the predetermined piston assembly velocity.

During a compression stroke, fluid in lower working chamber 446 is pressurized causing fluid to react against valve discs 482. When the fluid pressure reacting against valve discs 482 overcomes the bending load for valve discs 482, valve discs 482 elastically deflect opening compression fluid passages 470 allowing fluid flow from lower working chamber 446 into upper working chambers 444. The strength of valve discs 482 and the size of compression fluid passages 470 will determine the damping characteristics for shock absorber 420 in compression. When fluid flows past washer 488 reaches a predetermined velocity, the flow around the inside diameter and the outside diameter of washer 488 becomes restricted and a pressure drop develops. Because the pressure on the lower working chamber side of washer 488 is now higher than the pressure on the upper working chamber side of washer 488, washer 488 will move away from valve body 460 and progressively close the flow path between the inside diameter of washer 488 and retainer 480. Eventually washer 488 will contact retainer 480 creating a closed position. The total flow area between the outside diameter of washer 488 and the inside diameter of pressure tube 430 is designed to be less than the total flow area of the plurality of compression fluid passages 470. Thus, when washer 488 closes, the flow area is decreased and the damping force that is developed will increase.

Rebound valve assembly 464 comprises a of valve disc 490, a spring retainer 492, a spring 494 and nut 468. Nut 468 is threadingly received on piston rod 434 and biases valve disc 490 against valve body 460 to close the plurality of rebound fluid passages 472. Spring 494 is disposed between nut 468 and spring retainer 492 to bias spring retainer 492 towards valve body 460 and valve disc 490 against valve body 460. During a rebound stroke, fluid in upper working chamber 444 is pressurized causing fluid pressure to react against the plurality of valve discs 490. When the fluid pressure against the plurality of valve discs 490 overcomes the bending loads of the plurality of valve discs 490 and the biasing of spring 494, the plurality of valve discs 490 deflect away from valve body 460 to open the plurality of rebound fluid passages 472. The design of the plurality of valve discs 490, the size of the plurality of rebound fluid passages 472 and the design for spring 494 will determine the damping characteristics for shock absorber 420 during a rebound stroke.

Figure 10:
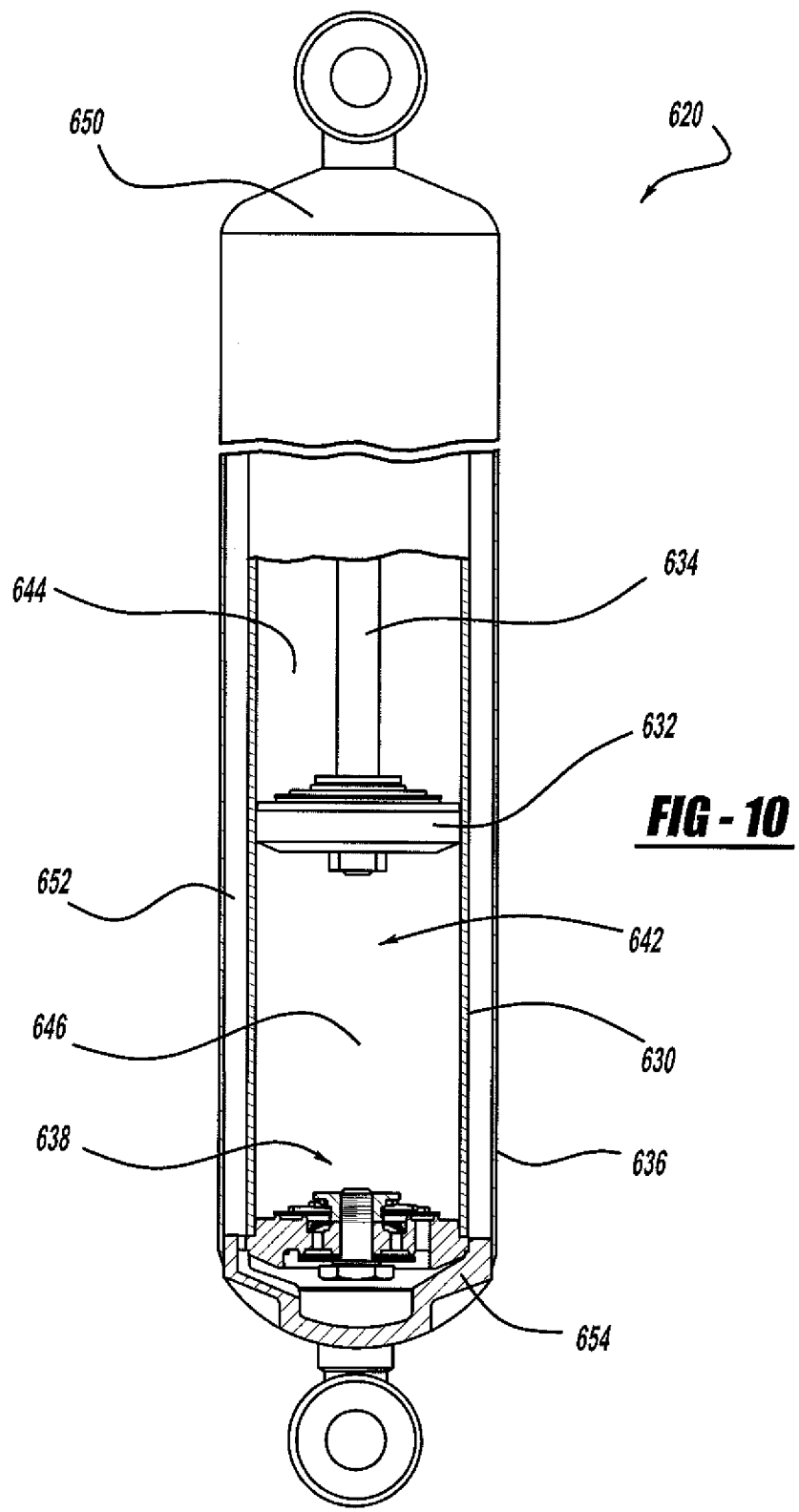
FIG. 10 is a side sectional view of a shock absorber in accordance with another embodiment of the present invention.

Referring now to FIG. 10, a shock absorber 620 is shown in greater detail. While FIG. 10 illustrates only shock absorber 620, it is to be understood that shock absorber 26 can also include the valve assemblies described below for shock absorber 620. Shock absorber 26 only differs from shock absorber 620 in the manner in which it is adapted to be connected to the sprung and unsprung masses of vehicle 10. Shock absorber 620 comprises a pressure tube 630, a piston assembly 632, a piston rod 634, a reservoir tube 636 and a base valve assembly 638.

Pressure tube 630 defines a working chamber 642. Piston assembly 632 is slidably disposed within pressure tube 630 and divides working chamber 642 into an upper working chamber 644 and a lower working chamber 646. A seal 648 is disposed between piston assembly 632 and pressure tube 630 to permit sliding movement of piston assembly 632 with respect to pressure tube 630 without generating undue frictional forces as well as sealing upper working chamber 644 from lower working chamber 646. Piston rod 634 is attached to piston assembly 632 and extends through upper working chamber 644 and through an upper end cap 650 which closes the upper end of pressure tube 630. A sealing system seals the interface between upper end cap 650, reservoir tube 636 and piston rod 634. The end of piston rod 634 opposite to piston assembly 632 is adapted to be secured to the sprung portion of vehicle 10. Valving within piston assembly 632 controls the movement of fluid between upper working chamber 644 and lower working chamber 646 during movement of piston assembly 632 within pressure tube 630. Because piston rod 634 extends only through upper working chamber 644 and not lower working chamber 646, movement of piston assembly 632 with respect to pressure tube 630 causes a difference in the amount of fluid displaced in upper working chamber 644 and the amount of fluid displaced in lower working chamber 646. The difference in the amount of fluid displaced is known as the "rod volume" and it flows through base valve assembly 638.

Reservoir tube 636 surrounds pressure tube 630 to define a fluid reservoir chamber 652 located between tubes 630 and 636. The bottom end of reservoir tube 636 is closed by an end cap 654 which is adapted to be connected to the unsprung portion of vehicle 10. The upper end of reservoir tube 636 is attached to upper end cap 650. Base valve assembly 638 is disposed between lower working chamber 646 and reservoir chamber 652 to control the flow of fluid between chambers 646 and 652. When shock absorber 620 extends in length, an additional volume of fluid is needed in lower working chamber 646 due to the "rod volume" concept. Thus, fluid will flow from reservoir chamber 652 to lower working chamber 646 through base valve assembly 638 as detailed below. When shock absorber 620 compresses in length, an excess of fluid must be removed from lower working chamber 646 due to the "rod volume" concept. Thus, fluid will flow from lower working chamber 646 to reservoir chamber 652 through base valve assembly 638 as detailed below.

Figure 11:
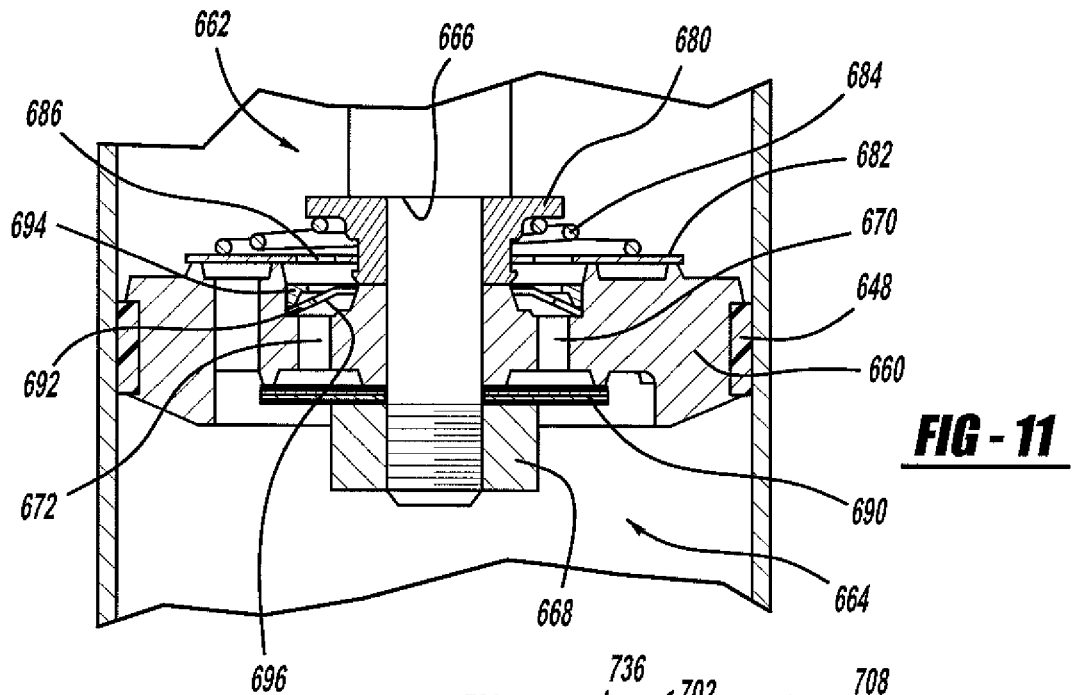
FIG. 11 is an enlarged cross-sectional view of the piston assembly illustrated in FIG. 10.

Referring now to FIG. 11, piston assembly 632 comprises a valve body 660, a compression check valve assembly 662 and a rebound valve assembly 664. Compression check valve assembly 662 is assembled against a shoulder 666 on piston rod 634. Valve body 660 is assembled against compression check valve assembly 662 and rebound valve assembly 664 is assembled against valve body 660. A nut 668 secures these components to piston rod 634. Valve body 660 defines a plurality of compression passages 670 and a plurality of rebound passages 672.

Compression check valve assembly 662 comprises a retainer 680, a valve disc 682 and a spring 684. Retainer 680 abuts shoulder 666 on one end and valve body 660 on the other end. Valve disc 682 abuts valve body 660 and closes compression passages 670. Valve disc 682 defines a plurality of apertures 686 which leave rebound passages 672 open. Spring 684 is disposed between retainer 680 and valve disc 682 to bias valve disc 682 against valve body 660. During a compression stroke, fluid in lower working chamber 646 is pressurized causing fluid pressure to react against valve disc 682. When the fluid pressure against valve disc 682 overcomes the biasing load of spring 684, valve disc 682 separates from valve body 660 to open compression passages 670 and allow fluid flow from lower working chamber 646 to upper working chamber 644. Typically, spring 684 only exerts a light biasing load on valve disc 682 and compression check valve assembly 662 acts as a check valve between chambers 646 and 644. The damping characteristics for shock absorber 620 during a compression stroke are controlled by base valve assembly 638 which accommodates the flow of fluid from lower working chamber 646 to reservoir chamber 652 due to the "rod volume" concept. During a rebound stroke, compression passages 670 are closed by valve disc 682.

Rebound valve assembly 664 comprises a plurality of valve discs 690, a velocity sensitive valve disc 692 shaped as a Belleville spring and a disc retainer 694. The plurality of valve discs 690 are sandwiched between valve body 660 and nut 668 to close the plurality of rebound passages 672. Velocity sensitive valve disc 692 is nested below valve disc 682 of compression check valve assembly 662 on the opposite side of valve body 660 from the plurality of valve discs 690. Disc retainer 694 is press fit within an annular channel defined by valve body 660 to retain velocity sensitive valve disc 692. Velocity sensitive valve disc 692 defines a plurality of slots or apertures 696 which allow fluid flow when velocity sensitive valve disc 692 is in its closed position. When fluid pressure is applied to valve discs 690, they will elastically deflect at their outer peripheral edge to open rebound valve assembly 664.

During a rebound stroke, fluid in upper working chamber 644 is pressurized causing fluid to react against valve discs 690. When the fluid pressure reacting against valve discs 690 overcomes the bending load for valve discs 690, valve discs 690 elastically deflect opening rebound passages 672 allowing fluid flow from upper working chamber 644, through apertures 686, past velocity sensitive valve disc 692, through rebound passages 672 and into lower working chamber 646. The strength of valve discs 690 and the size of rebound passages 672 will determine the damping characteristics for shock absorber 620 in rebound. When the fluid flow past velocity sensitive valve disc 692 reaches a predetermined velocity, the flow between velocity sensitive valve disc 692 and valve body 660 become restricted and a pressure drop develops. Because the pressure on the upper working chamber side of velocity sensitive valve disc 692 is now higher than the pressure on the lower working chamber side of velocity sensitive valve disc 692, velocity sensitive valve disc 692 will deflect towards valve body 660. Eventually contact will occur between velocity sensitive valve disc 692 and valve body 660 creating a closed position. The total flow area through apertures 696 of velocity sensitive valve disc 692 is designed to be less than the total flow area of the plurality of rebound passages 672. Thus, when velocity sensitive valve disc 692 closes, the flow area is decreased and the damping force that is developed will increase.

Figure 12:
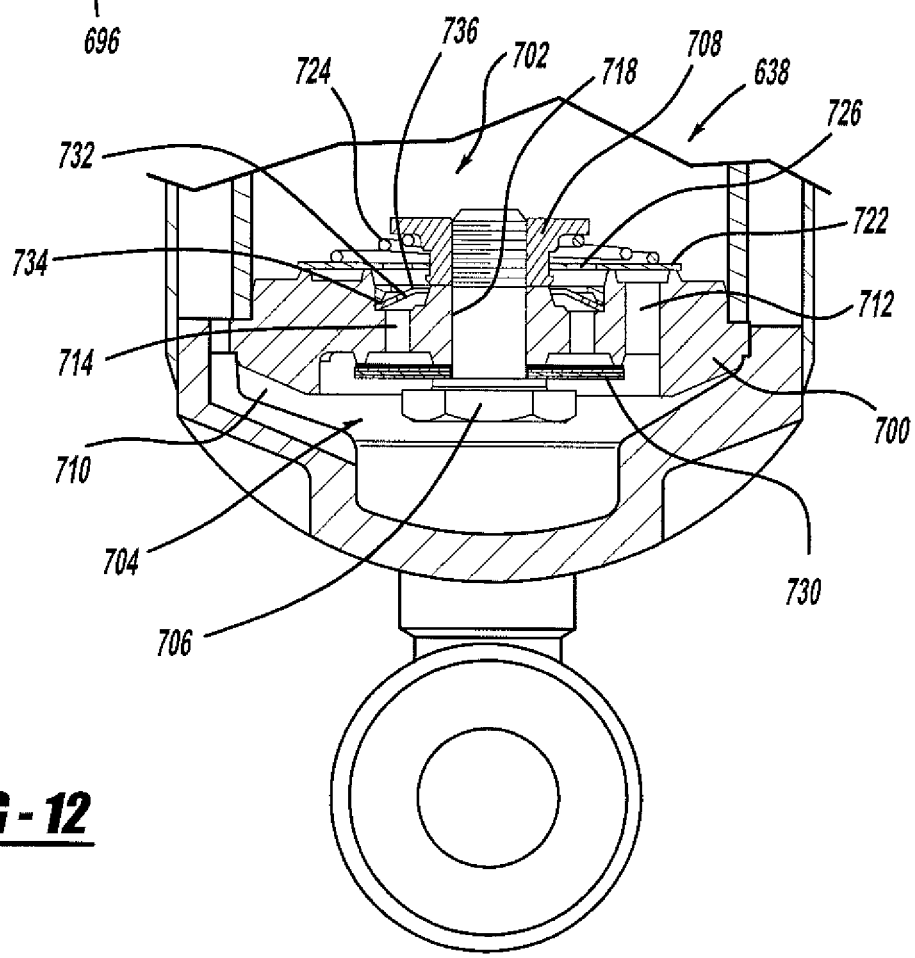
FIG. 12 is an enlarged cross-sectional view of the base valve assembly illustrated in FIG. 10.

Referring now to FIG. 12, base valve assembly 638 comprises a valve body 700, an intake or rebound check valve assembly 702, a compression valve assembly 704, a retaining bolt 706 and a retaining nut 708. Valve body 700 is secured to pressure tube 630 and end cap 654 by press fitting or by other methods known well in the art. End cap 654 is secured to reservoir tube 636 and it defines a plurality of fluid passages 710 which allow communication between reservoir chamber 652 and base valve assembly 638. Valve body 700 defines a plurality of intake or rebound fluid passages 712, a plurality of compression fluid passages 714, and a central bore 718. Retaining bolt 706 extends through central bore 718 and threadingly engages retaining nut 708 to secure both rebound check valve assembly 702 and compression valve assembly 704 to valve body 700. While FIG. 12 illustrates retaining bolt 706 and retaining nut 708 other retainers including but not limited to a valve pin can be utilized.

Rebound check valve assembly 702 comprises retaining nut 708, a valve disc 722 and a spring 724. Valve disc 722 abuts valve body 700 and closes rebound fluid passages 712. Valve disc 722 defines a plurality of apertures 726 which leave compression fluid passages 714 open. Spring 724 is disposed between retaining nut 708 and valve disc 722 to bias valve disc 722 against valve body 700. During a rebound stroke, fluid in lower working chamber 646 is reduced in pressure causing fluid pressure in reserve chamber 652 to react against valve disc 722. When the fluid pressure against valve disc 722 overcomes the biasing load of spring 724, valve disc 722 separates from valve body 700 to open rebound fluid passages 712 and allow fluid flow from reserve chamber 652 to lower working chamber 646. Typically, spring 724 only exerts a light biasing load on valve disc 722 and rebound check valve assembly 702 acts as a check valve between chambers 652 and 646. The damping characteristics for shock absorber 620 during a rebound stroke are controlled by piston assembly 632 which accommodates the flow of fluid from upper working chamber 644 to lower working chamber 646 as detailed above. During a compression stroke, rebound fluid passages 712 are closed by valve disc 722.

Compression valve assembly 704 comprises a plurality of valve discs 730, a velocity sensitive valve disc 732 and a disc retainer 734. The plurality of valve discs 730 are sandwiched between valve body 700 and retaining bolt 706 to close the plurality of compression fluid passages 714. Velocity sensitive valve disc 732 is nested below valve disc 722 of rebound check valve assembly 702 on the opposite side of valve body 700 from the plurality of valve discs 730. Disc retainer 734 is press fit within an annular channel defined by valve body 700 to retain velocity sensitive valve disc 732. Velocity sensitive valve disc 732 defines a plurality of slots or apertures 736 which allow fluid flow where velocity sensitive valve disc 732 is in its closed position. When fluid pressure is applied to valve discs 730, they will elastically deflect at their outer peripheral edge to open compression valve assembly 704.

During a compression stroke, fluid in lower working chamber 646 is pressurized causing fluid to react against valve discs 730. When the fluid pressure reacting against valve discs 730 overcomes the bending load for valve discs 730, valve discs 730 elastically deflect opening compression fluid passages 714 allowing fluid flow from lower working chamber 646, through apertures 726, past velocity sensitive valve disc 732, through compression fluid passages 714 and into reservoir chamber 652. The strength of valve discs 730 and the size of compression fluid passages 714 will determine the damping characteristics for shock absorber 620 in compression. When the fluid flow past velocity sensitive valve disc 732 reaches a predetermined velocity, the flow between velocity sensitive valve disc 732 and valve body 700 becomes restricted and a pressure drop develops. Because the pressure on the lower working chamber side of velocity sensitive valve disc 732 is now higher than the pressure on the reservoir chamber side of velocity sensitive valve disc 732, velocity sensitive valve disc 732 will deflect towards valve body 700. Eventually contact will occur between velocity sensitive valve disc 732 and valve body 700 creating a closed position. The total flow area through apertures 796 of velocity sensitive valve disc 794 is designed to be less than the total flow area of the plurality of compression fluid passages 714. Thus, when velocity sensitive valve disc 732 closes, the flow area is decreased and the damping force that is developed will increase.

Figure 13:
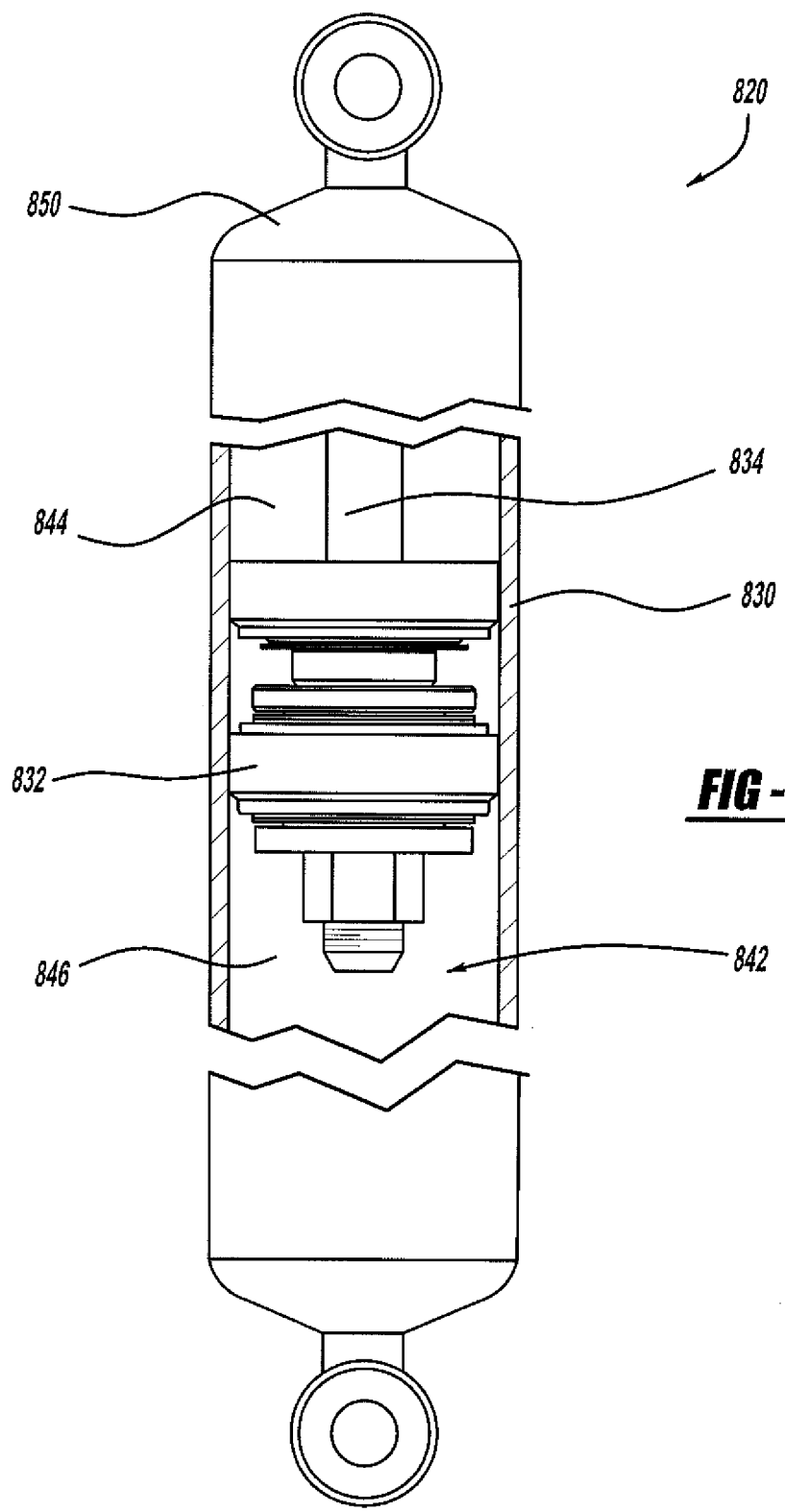
FIG. 13 is a side sectional view of a shock absorber in accordance with another embodiment of the present invention.
Figure 14:
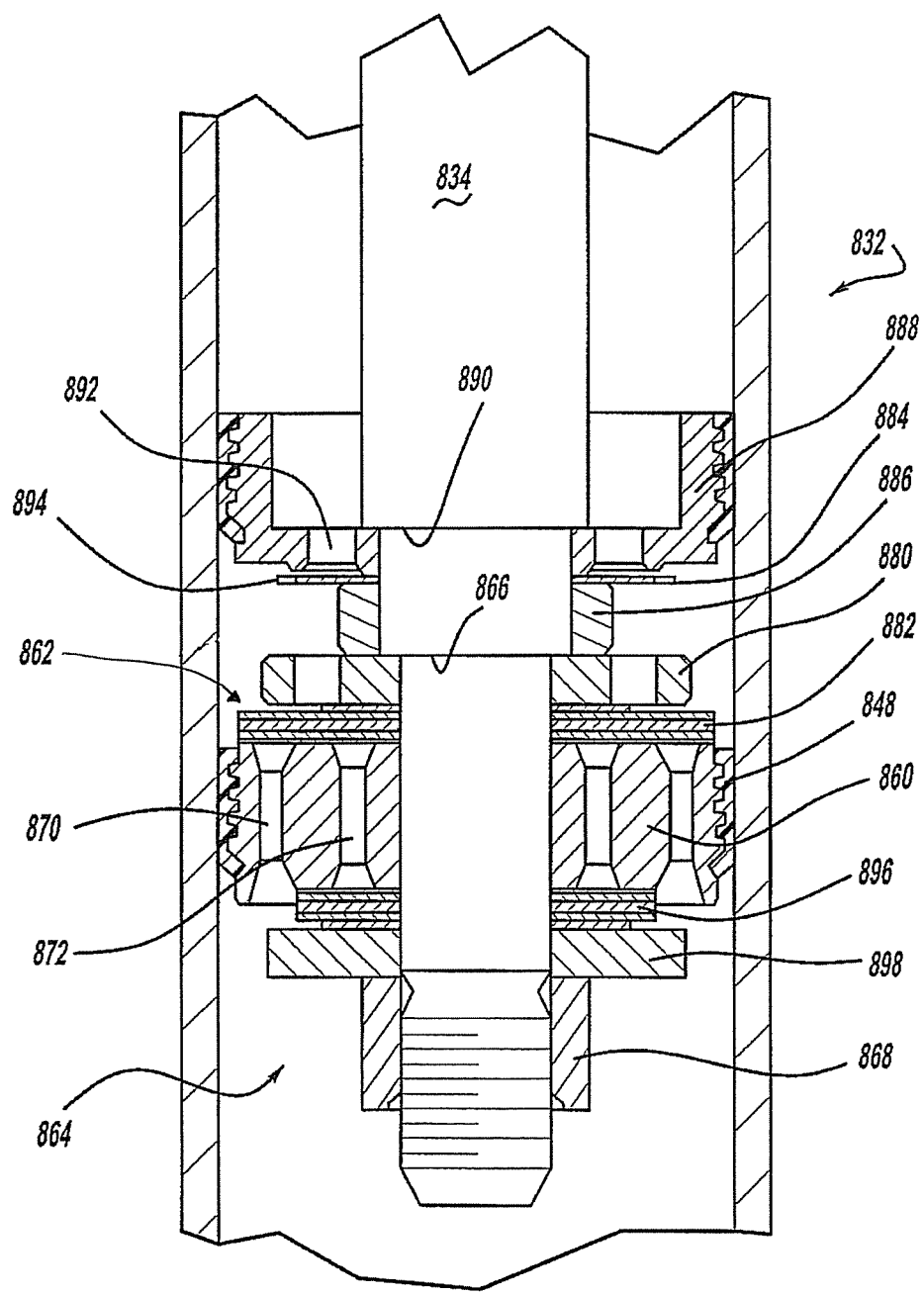
FIG. 14 is an enlarged cross-sectional view of the piston assembly illustrated in FIG. 13.

Referring now to FIG. 13, a shock absorber 820 is shown in greater detail. Shock absorber 820 is a monotube design. While FIG. 14 illustrates only shock absorber 820, it is to be understood that shock absorber 26 can also include the valve assemblies described below for shock absorber 820. Shock absorber 26 only differs from shock absorber 820 in the manner in which it is adapted to be connected to the sprung and unsprung masses of vehicle 10. Shock absorber 820 comprises a pressure tube 830, a piston assembly 832 and a piston rod 834.

Pressure tube 830 defines a working chamber 842. Piston assembly 832 is slidably disposed within pressure tube 830 and divides working chamber 842 into an upper working chamber 844 and a lower working chamber 846. A seal 848 is disposed between piston assembly 832 and pressure tube 830 to permit sliding movement of piston assembly 832 with respect to pressure tube 830 without generating undue frictional forces as well as sealing upper working chamber 844 from lower working chamber 846. Piston rod 834 is attached to piston assembly 832 and extends through upper working chamber 844 and through an upper end cap 850 which closes the upper end of pressure tube 830. A sealing system seals the interface between upper end cap 850, reservoir tube 836 and piston rod 834. The end of piston rod 834 opposite to piston assembly 832 is adapted to be secured to the sprung portion of vehicle 10. Valving within piston assembly 832 controls the movement of fluid between upper working chamber 844 and lower working chamber 846 during movement of piston assembly 832 within pressure tube 830. Because piston rod 834 extends only through upper working chamber 844 and not lower working chamber 846, movement of piston assembly 832 with respect to pressure tube 830 causes a difference in the amount of fluid displaced in upper working chamber 844 and the amount of fluid displaced in lower working chamber 846. The difference in the amount of fluid displaced is known as the "rod volume" and it is compensated for by a sealed chamber within working chamber 842 as is known in the art.

Referring now to FIG. 14, piston assembly 832 comprises a valve body 860, a compression valve assembly 862 and a rebound valve assembly 864. Compression valve assembly 862 is assembled against a shoulder 866 on piston rod 834. Valve body 860 is assembled against compression valve assembly 862 and rebound valve assembly 864 is assembled against valve body 860. A nut 868 secures these components to piston rod 834. Valve body 860 defines a plurality of compression fluid passages 870 and a plurality of rebound fluid passages 872.

Compression valve assembly 862 comprises a retainer 880, a plurality of valve discs 882, a velocity sensitive valve disc 884, a spacer 886 and a piston 888. Retainer 880 abuts shoulder 866 on one end and the plurality of valve discs 882 on the opposite end. The plurality of valve discs 882 abut valve body 460 and close fluid compression passages 470. Spacer 886 abuts retainer 880 on the side opposite to the plurality of valve discs 882. Velocity sensitive valve disc 884 abuts spacer 886 and piston 888 abuts velocity sensitive valve disc 884. Piston 888 also abuts a shoulder 890 defined by piston rod 834. Velocity sensitive valve disc 884 abuts a disc land on piston 888 which provides a clearance between piston 888 at the surface that defines a plurality of fluid passages 892 which extend through piston 888. The clearance between velocity sensitive valve disc 884 and piston 888 defines a flow passage for fluid to flow through the plurality of fluid passages 892. This flow passage will progressively close with the deflection of velocity sensitive valve disc 884 toward piston 888. Velocity sensitive valve disc 884 defines a plurality of slots or apertures 894 which allow fluid flow when velocity sensitive valve disc 884 is in its closed position. The closing of velocity sensitive valve disc 884 will create the required increase in damping load at the predetermined piston assembly velocity. Piston 888 sealingly engages the internal surface of pressure tube 830 which directs all fluid flow through the plurality of fluid passages 892 during movement of piston assembly 832.

During a compression stroke, fluid in lower working chamber 846 is pressurized causing fluid to react against valve discs 882. When the fluid pressure reacting against valve discs 882 overcomes the bending load for valve discs 882, valve discs 882 elastically deflect opening compression fluid passages 870 allowing fluid flow from lower working chamber 846 into upper working chambers 844. The strength of valve discs 882 and the size of compression fluid passages 870 will determine the damping characteristics for shock absorber 820 in compression. When fluid flows past velocity sensitive valve disc 884 reaches a predetermined velocity, the flow becomes restricted and a pressure drop develops. Because the pressure on the lower working chamber side of velocity sensitive valve disc 884 is now higher than the pressure on the upper working chamber side of velocity sensitive valve disc 884, velocity sensitive valve disc 884 will deflect toward piston 888 and progressively close the plurality of fluid passages 892. Eventually velocity sensitive valve disc 884 will contact piston 888 creating a closed position. The total flow area of the plurality of apertures 894 is designed to be less than the total flow area of the plurality of compression fluid passages 870. Thus, when velocity sensitive valve disc 884 closes, the flow area is decreased and the damping force that is developed will increase.

Rebound valve assembly 864 comprises a plurality of valve discs 896, a retainer 898 and nut 868. Nut 868 is threadingly received on piston rod 834 and biases spring retainer 492 against the plurality of valve discs 896 and the plurality of valve discs 896 against valve body 860 to close the plurality of rebound fluid passages 872. During a rebound stroke, fluid in upper working chamber 844 is pressurized causing fluid pressure to react against the plurality of valve discs 896. When the fluid pressure against the plurality of valve discs 896 overcomes the bending loads of the plurality of valve discs 896, the plurality of valve discs 896 deflect away from valve body 860 to open the plurality of rebound fluid passages 872. The design of the plurality of valve discs 896 and the size of the plurality of rebound fluid passages 872 will determine the damping characteristics for shock absorber 420 during a rebound stroke.

What is claimed is:

1. A shock absorber comprising:
   a pressure tube forming a fluid chamber;
   a first piston disposed within said working chamber, said first piston engaging said pressure tube to divide said fluid chamber into an upper working chamber and a lower working chamber, said first piston defining a piston compression passage and a piston rebound passage;
   a piston rod attached to said first piston, said piston rod extending through one end of said pressure tube;
   a first valve assembly including a first valve disc engaging said first piston;
   a second valve assembly engaging said first piston;
   a second piston engaging said pressure tube, said second piston disposed within one of said upper and lower working chambers, said second piston defining a fluid passage;
   a normally open piston velocity sensitive valve attached to said piston rod, said piston velocity sensitive valve including a second valve disc movable between an open position and a closed position in response to a first predetermined velocity of said first and second piston with respect to said pressure tube; wherein
   said second valve disc directly engaging said second piston when said second valve disc is in said closed position.

2. The shock absorber according to claim 1, further comprising an open fluid passage defined by one of said second valve disc and said second piston bypassing said second valve disc of said piston velocity sensitive valve.

3. The shock absorber according to claim 1, wherein said second valve assembly is a rebound valve assembly, said rebound valve assembly normally closing said piston rebound passage, said rebound valve assembly moving to an open position during a rebound movement of said shock absorber.

4. The shock absorber according to claim 1, wherein said second valve disc defines an aperture defining an open fluid passage bypassing said second valve disc.

5. The shock absorber according to claim 1, wherein said second valve disc is disposed between said first valve disc of said first valve assembly and said second piston.

6. The shock absorber according to claim 1, wherein said second valve disc is disposed adjacent said first valve disc of said first valve assembly.

7. The shock absorber according to claim 1, wherein an inner portion of said second valve disc is fixedly attached to said piston rod such that axial movement of said inner portion of said second valve disc with respect to said piston rod is prohibited.

8. The shock absorber according to claim 1, further comprising:
   a reservoir tube surrounding said pressure tube to define a reservoir chamber and a base valve assembly disposed between said working chamber and said reservoir chamber, said base valve assembly comprising:
   a base valve body disposed between said working chamber and said reservoir chamber, said base valve body defining a base compression passage and a base rebound passage;
   a third valve assembly engaging said base valve body;
   a fourth valve assembly engaging said base valve body;
   a base velocity sensitive valve attached to said base valve body, said base velocity sensitive valve movable between an open position and a closed position in response to a second predetermined velocity of said piston body with respect to said pressure tube.

9. The shock absorber according to claim 8, wherein said base velocity sensitive valve comprises a third valve disc disposed adjacent said third valve assembly.

10. The shock absorber according to claim 9, further comprising an open fluid passage defined by one of said base valve body and said third valve disc bypassing said third valve disc of said base velocity sensitive valve.

11. The shock absorber according to claim 9, wherein said fourth valve assembly is a compression valve assembly, said compression valve assembly normally closing said base compression passage, said compression valve assembly moving to an open position during a compression movement of said shock absorber.

12. The shock absorber according to claim 9, wherein said third valve disc defines an aperture defining an open fluid passage bypassing said third valve disc.

13. The shock absorber according to claim 9, wherein said third valve disc is disposed between said third valve assembly and said base valve body.

14. The shock absorber according to claim 1, wherein said first valve disc of said first valve assembly is disposed between said second valve disc of said piston velocity sensitive valve and said first piston.

* * * * *